US005250336A

United States Patent [19]

Greuse et al.

[11] Patent Number: 5,250,336

[45] Date of Patent: Oct. 5, 1993

[54] COLORED RELEASE LINER

[75] Inventors: Herve Greuse, St. Denis; Guy Siraux, Mignault, both of Belgium

[73] Assignee: Morgan Adhesives Company, Stow, Ohio

[21] Appl. No.: 834,886

[22] Filed: Feb. 11, 1992

[51] Int. Cl.[5] .................... C09J 7/02

[52] U.S. Cl. .................... 428/40; 428/42; 428/352

[58] Field of Search .................... 428/40, 42, 352

[56] References Cited

U.S. PATENT DOCUMENTS 3,726,710 4/1973 Berger .................... 428/452
4,075,389 2/1978 Vassiliades .................... 428/42
4,716,052 12/1987 Waugh .................... 427/147

*Primary Examiner*—Jenna L. Davis
*Attorney, Agent, or Firm*—Oldham Oldham & Wilson

[57] ABSTRACT

A pressure-sensitive laminate composition is described which enables the easy detection of improperly die-cut patterns which has a backing material, a silicone release coating, a non-migratory colorant dispersed in the silicone, a pressure-sensitive adhesive, and a face stock. Alternatively, a release liner composition is described having a non-migratory silicone coating on a backing material. One colorant used is carbon black. The carbon black is dispersed in the release layer either in a solvent-free system, or in an organic medium, which is preferably a mixed organic solvent, in which at least one of the solvents used is at least partially polar.

8 Claims, 1 Drawing Sheet

COLORED RELEASE LINER

TECHNICAL FIELD

This invention relates to a composition effective in improving the contrast between the release liner backing paper and face stock used in pressure-sensitive laminate manufacture through the addition of a colorant to the polysiloxane polymeric coating on the release liner.

BACKGROUND OF THE INVENTION

The process of making pressure-sensitive adhesive laminate wherein the face stock is die-cut involves several sequential steps. In general, a backing paper or continuous web material is coated by roll coating with a release layer. This release layer is usually a silicone-based polymer. A removable and/or permanent pressure-sensitive adhesive is applied to the exposed surface of the release layer in a manner similar to that used for the release layer. This adhesive is typically a permanent and/or removable pressure-sensitive adhesive. Finally, face stock is applied to the exposed surface of the pressure-sensitive adhesive. The label may be printed or otherwise decorated by silkscreening or other conventional printing techniques on the face stock. This label stock material can be in either sheet or roll form. In some instances, the labels are die-cut with undesired matrix material removed.

The inability to easily and quickly detect imperfectly formed die-cut patterns is an old problem. This situation is particularly troublesome when white backing paper is used with white face stock to produce labels and/or signage, or more broadly stated, when similarly colored facestock is applied to similarly colored backing paper, and additionally, in the situation where there is transparent facestock with lettering of a similar coloration to the backing paper. When letters, particularly those with closed areas, such as the letter O, or letter A, or punctuation marks, are die-cut and the undesired matrix removed from the face stock, it is difficult to determine the quality of the die-cut with a similar color scheme of face stock and backing paper. A color contrast would be most desirable between the die-cut face stock and the backing material.

Prior art solutions to this problem have included coloration of the backing paper. While this may be effective in some instances, many production lines are geared toward using backing material with certain processing characteristics and the colorant employed in the backing paper can adversely affect these characteristics. Additionally, many label manufacturers do not wish to change their backing paper suppliers for reasons such as cost, long-term contract, quality, etc.

In U.S. Pat. No. 4,716,052 to Waugh et al., the adhesive layer was colored to provide a background for information or indicia printed thereon. The purpose of this coloration though was for decorative purposes only, and could not solve the problem of identifying improperly die-cut labels as the adhesive is removed with the undesired matrix.

The coloration of the polysiloxane polymer release coating is an alternative to coloring the backing material. Until now, however, there has been no effective means for coloring this layer without significantly affecting the release characteristics of the polysilane polymer release coating, the characteristics of the pressure-sensitive adhesive as it releases from the release coating, and/or the migration of the colorant into the pressure-sensitive adhesive to degrade the adhesive properties.

SUMMARY OF THE INVENTION

This invention provides a way for effecting coloration of the silicone release layer without changing the peel of a pressure sensitive adhesive coated facing layer, nor the adhesive characteristics thereof. The ability to effect coloration to various and/or different colors in the silicone release layer of a pressure sensitive laminate has many advantages, and is particularly useful when the coloration can occur within the silicone release layer itself without effecting the peel or the characteristics of the pressure sensitive adhesive itself. The particular advantages are recited in the objects of the invention set forth hereinafter.

It is a first object of this invention to facilitate the weeding operation as it relates to the ability to discriminate imperfectly cut white patterns on white backing paper.

It is a second object of this invention to facilitate the weeding operation as it relates to the ability to discriminate imperfectly cut white patterns on clear films.

It is a third object of this invention to effect the weeding operation by a visual means.

It is a fourth object of this invention to effect the visual detection by the addition of a colorant to the polysiloxane polymer release coating.

It is a fifth object of this invention to effect the coloration inexpensively.

It is a sixth object of this invention to effect the coloration with negligible migration of the colorant into the pressure-sensitive adhesive.

It is a seventh object of this invention to utilize a pattern coating arrangement on the release liner with variations in the color for different effects on the face.

It is an eighth object of this invention to show the defects in the coating weight uniformity, i.e., they are visible to the naked eye.

It is an ninth object of this invention to show in a clear adhesive if there has been silicone transfer from the silicone coating on the liner to the adhesive, thereby eliminating the use of a die stain currently being used to determine the amount of silicone transfer.

It is a tenth object of this invention to visually observe gel particles or adhesive defects or irregularities of a clear adhesive coated onto a clear face sheet.

It is an eleventh object of this invention to measure the coating weight of the silicone by measuring or determining the color variations, i.e., darker coloration would indicate a thicker coating and a light or a color closer to the backing color would indicate less coating weight.

It is a twelfth object of this invention to perform the silicone coloration in a solventless system.

These and other objects of this invention will be evident when viewed in light of the drawings, detailed description, and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED COMPONENT PART LIST

Figure 1:
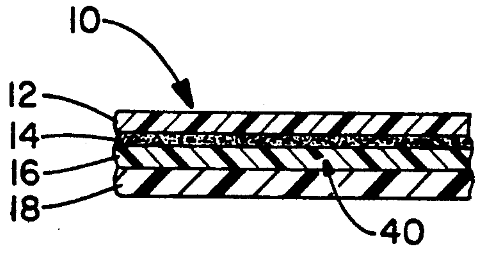
FIG. 1 is an enlarged side elevational view of a cross-section of a label assembly.

| Part Number | Description |
|---|---|
| 10 | label assembly |
| 12 | face stock layer |
| 14 | adhesive layer |
| 16 | colored release layer |
| 18 | backing layer |
| 20 | signage |
| 22 | transparent face stock layer |
| 24 | adhesive layer |
| 26 | colored release layer |
| 28 | backing layer |
| 30 | printing |
| 32 | retained facestock |
| 34 | exposed colored release layer after partial facestock removal |
| 36 | exposed interior letter release layer after facestock removal for a closed letter |
| 38 | exposed interior letter silicone layer after facestock removal for an open letter |
| 40 | colorant |
| 42 | die-cut label assembly |
| 44 | removed facestock material |
| 46 | outline of die-cut remainder |
| 47 | die-cut remainder |
| 48 | adhesive layer |
| 50 | backing layer |
| 52 | patterned colorant release layer |

DETAILED DESCRIPTION OF THE INVENTION

Referring now to the drawings wherein the showings are for purposes of illustrating the preferred embodiment of the invention only and not for purposes of limiting the same, the Figures show a label or signage in which a release layer has been colored, thereby permitting a die-cut weeding operation to be effected by visual means.

As shown in FIG. 1, a label assembly 10 is shown in cross-sectional view. Label assembly 10 comprises a top sheet face stock layer or film layer 12 which is releasably adhered to a backing sheet or layer 18 by means of adhesive layer 14 overlaying release layer 16. The combination of release layer 16 and backing layer 18 are sometimes referred together as a release liner. The function of the release liner is to enable the face stock 12 to be stored and transported for subsequent application to a product on which it is to be applied.

In label manufacturing, normally both release layer 16 and adhesive layer 14 are uniformly distributed along the surface of backing layer 18 and face stock 12 respectively. In a preferred embodiment, release layer 16 is a polysiloxane polymer (e.g. silicone), which may or may not be derivatized depending upon the specific application. Adhesive layer 14 is usually a pressure-sensitive adhesive, and can be selected from a wide variety of commercially available adhesives, such as, for example, an acrylic pressure-sensitive adhesive, a water-soluble emulsion type pressure-sensitive adhesive, a hot melt or a hot melt pressure-sensitive adhesive. In the invention, colorant 40 is distributed throughout release layer 16. During manufacture, colorant 40 is added simultaneously with release layer 16.

Figure 2:
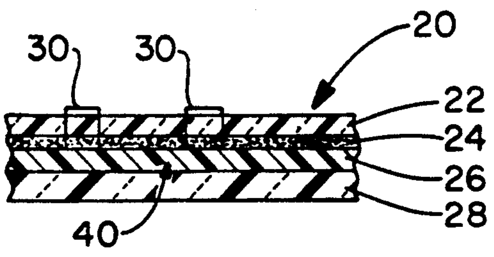
FIG. 2 is an enlarged side elevational view of a cross-section of signage.

While the discussion has focused on the label application, the invention is applicable for signage. As shown in FIG. 2, the signage embodiment of the invention is analogous to that described for the label, in that the signage 20 is a multi-layered product in which face stock layer 22 is releasably adhered to backing layer 28 via adhesive layer 24 overlaying release layer 26. Distinguishing features are the fact that the face stock layer 22 is transparent, and that lettering 30 is positioned either on the exterior of face stock layer 22 or on the interior of face stock layer 22 adjacent to adhesive layer 24 (not shown when lettering 30 is positioned on the interior of face stock layer 22). As is readily apparent, lettering 30 may need to be reverse printed depending upon the direction which the signage is facing.

Figure 3:
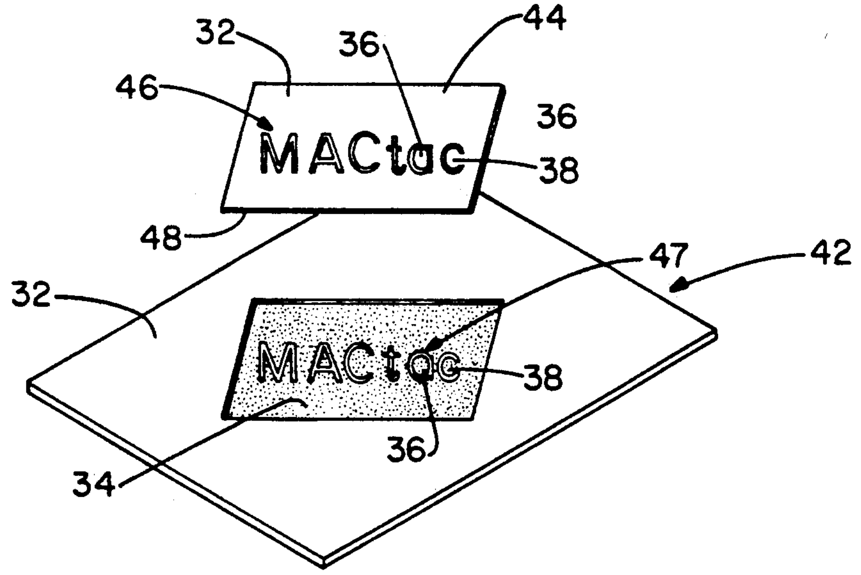
FIG. 3 is a perspective view of a die-cut label showing the partial removal of the facestock layer.

As shown in FIG. 3, for some applications, die-cut label 42 may have some of the facestock 32 removed. This is indicated by region 44 where some of the original facestock 32 has been removed thereby exposing in this case, a die-cut outline of the letters 46 spelling "MACtac" and underlying colored release layer 34. The die-cut remainder 47, of course in this instance, also is the letters "MACtac". The numeral 48 indicates the pressure-sensitive adhesive or the underside of the facestock 32. During the removal process, contiguous regions 38 are easily removed with facestock material 44. Much more difficult are interior portions 36. By the utilization of a colored release layer, imperfectly cut and weeded letters are now visually detectable when the color of the facestock is similar or identical to the color of the backing layer (i.e. white printing overlaying clear adhesive and colored release layer on white backing paper).

Effectively the showing of FIG. 3 is preferably done by a CAD-CAM procedure which may be automatically or manually controlled. In an automatic CAD-CAM operation, the removal of the facestock material 44 and exposed interior letter regions 38 may be automated, but the removal of the interior region 36 must normally be done manually. The visual detection of imperfectly formed die cutting in the regions 36 and 38, for example, because of the contrast in coloration of the facestock material 44 and the silicone coated release layer 34 thus insures that the CAD-CAM system can be quickly adjusted to insure proper die cutting is being achieved.

Figure 4:
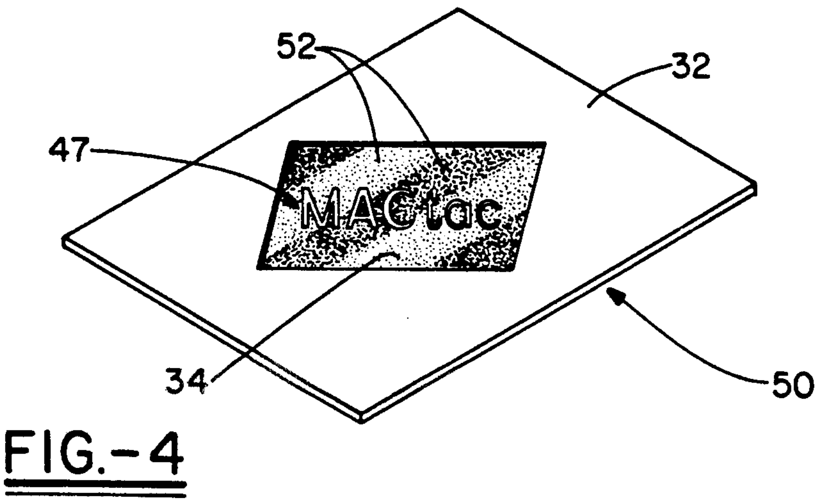
FIG. 4 is a perspective view of a die-cut label with some facestock material removed.

While the application of color to release layer 34 is generally uniform, for ease of application, there is no need to limit the invention to such. In fact it is contemplated that the coloration of the release layer could very well be non-uniform by design 50 as shown in FIG. 4, thereby creating a patterned coating arrangement 52 on the release liner with the color variations producing desirable visual shading effects.

An additional feature of the utilization of colored release liners is that it will be quite easy when the adhesive employed is basically clear and transparent, to detect if there has been any silicone transfer from the silicone coating on the liner to the adhesive portion of the label. Areas of the adhesive side of the label where such transfer has taken place will be detectable as grey or other coloration areas on the adhesive. It will be instantly recognizable to the naked eye where this type of transfer has occurred and will enable the user to determine whether there is sufficient adhesive regions to effectively attach the label to a surface.

Additionally, by using a colored release liner, it will be also possible to visually observe gel particles or adhesive defects or irregularities of a clear adhesive coated onto a clear face sheet.

A further advantage of the coloration of the silicone release layer is achieved because in the highly automated process of silicone coating the release liner, the colored release layer being in contrast to the color of the liner itself will also quickly allow an operator, or an automatic color sensing device, to quickly visually determine the uniformity and thickness of the silicone release layer on the backing material or web. In this situation, it may be that a darker coloration area would indicate a thicker coating, and a lighter color would indicate a thinner coating. It is also easily possible to measure actual coating thickness based upon the measurements from the color sensing device by quickly determining the exact coloration that would represent a particular coating weight. The same quick visual determination would reveal if the coating weight is uniform across the web or whether there is some variation in coating weight occurring possibly because of a malfunction of the machinery doing the automated coating. The sooner that defects in coating weight on the release liner are noticed, the less scrap material is run, and of course, the more consistent in the functioning of the ultimate pressure sensitive adhesive laminate made utilizing the proper release liner.

It, of course, is obvious that while a complete label is shown in FIG. 3 the product could also be manufactured as a release liner. In this embodiment, which is a subset of FIG. 1, only backing paper 18, and release coating 16 with colorant 40 dispersed throughout release coating 16 is the product.

Reactants

Carbon Black is commercially available from DEGUSSA (Germany) as a powder, paste or dispersion in a wide variety of blends. As used in this application, the carbon black used was TACK 101 X ®, which is a dispersion containing 30% carbon black, 30% soya alkyd resin, 30% xylene, and 10% other components including a plasticizer. Present commercial uses for TACK 101 X ® include its application as a colorant for synthetic paints or oils.

The silicone used in this application is a package obtained from the DOW CORNING Corporation, marketed as SYL-OFF ® System II, an addition curing silicone coating system suitable for use as a dilute solution in organic solvent. It is used to coat the release liners of pressure sensitive adhesive laminates and tapes. The commercially available system components comprise: SYL-OFF ® Q2-7402 resin paper coating; SYL-OFF ® Q2-7403 catalyst, SYL-OFF ® 7048 crosslinker; and SYL-OFF ® Q2-7127 accelerator.

Coating Bath Preparation

The following procedure was used in the preparation of the coating bath. The base polymer component was dispersed in the process solvent(s) and stirred until the bath was completely homogeneous. A release modifier was thoroughly dispersed in the above mixture. A crosslinker was thoroughly dispersed, followed by the addition of the catalyst/optional accelerator with thorough dispersing. The order of addition enumerated in this preparation is not critical and may be performed in other sequences.

EXAMPLES

It is envisioned that the objects of this invention will become clearer through the following examples. Example 1 is that of a control with no colorant added. Example 2 contains the modified silicone colorant. Example 3 contains the modified silicone colorant added via a solventless system.

EXAMPLES 1

The following quantities of reactants were added to the silicone bath.

| | Quantity |
|---|---|
| Reactants | |
| heptane | 73 kg. |
| toluene | 39 kg. |
| silicone resin | 12 kg. |
| Additives | |
| catalyst | 168 g. |
| crosslinker | 60 g. |

EXAMPLE 2

The following quantities of reactants were added to the silicone bath.

| | Quantity |
|---|---|
| Reactants | |
| heptane | 73 kg. |
| toluene | 39 kg. |
| silicone resin | 12 kg. |
| carbon black | 1600 g. |
| Additives | |
| catalyst | 168 g. |
| crosslinker | 90 g. |
| accelerator | 90 g. |

EXAMPLE 3

The following quantities of reactants were added to the silicone bath.

| | Quantity |
|---|---|
| Reactants | |
| silicone resin | 12 kg. |
| carbon black | 1600 g. |
| Additives | |
| catalyst | 168 g. |
| crosslinker | 90 g. |
| accelerator | 90 g. |

Silicone Layer Deposition

A silicone release layer was applied by means of roll coating a thin layer of carbon black to one surface of the backing paper. In the case of Example 2, the silicone layer dispersed in a solvent contained a carbon black dispersion, therefore the resulting layer was gray in color. In Example 3, l a solventless system was employed.

DISCUSSION

The coloration of a label release liner is an inherently difficult problem. First, the addition of a colorant must not affect the reticulation properties of the release coating, which is typically a polysiloxane polymer, (e.g.

silicone). Silicone, as used in this application refers to any organosilicon oxide polymer in which the structural unit is

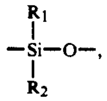

where $R_1$ and $R_2$ are monovalent organic radicals. The physical properties of silicones depend on the size and type of the radical, the R/Si ratio, and the molecular configuration of the polymer (i.e. linear, cyclic, degree of crosslinking). These products are characterized by high thermal and chemical stability and unusual release from sticking and surface properties.

The reticulation referred to earlier, relates to the polymeric network which forms as the release coating is dried through heating. The addition of almost any type of additive to the silicone solution, has the potential of altering the reticulation reaction speed. Since the process by which the release coating is applied to a surface of the backing paper is a continuous one, parameters such as crosslinker concentration, catalyst concentration, oven temperature, coating thickness, and silicone paste concentration all need to be in balance to effect proper reticulation as the product moves along the production line.

The colorant of this invention does not affect the release characteristics which exist at the release coating/releasable adhesive interface. The bonding characteristics are maintained wherein the bond which forms at the interface of the release liner and the releasable adhesive is the weakest bond in the label. Only by maintaining this relationship, wherein both the bond between the backing paper and release coating, and the bond formed between the releasable adhesive and face stock, are stronger than the interface bond between the release coating and the pressure sensitive adhesive, will appropriate release characteristics be present in the label.

The colorant does not migrate into either the backing paper or the releasable adhesive. In general, the migration into the backing paper is not a problem, but the potential is significant for migration into the adhesive. Highly conjugated organic dyes do exhibit migration, thereby decreasing the available concentration of the dye for visual detection purposes in the release coating. The mineral nature of the carbon black used in this application, minimized, if not eliminated the migration problem experienced with other colorants.

It should be understood that most release liners associated with pressure sensitive adhesive laminates are normally either white or brown in color, but there are certain circumstances where the liner itself might be of some other color for specific reasons. The instant invention contemplates that the coloration presented into the silicone layer must be in contrast to the color of the face material if it is in fact opaque, or in contrast to printing appearing on a clear or transparent face sheet, so that imperfections in die cutting, and/or printing respectively will be readily visually apparent. In this regard, it is important to the invention that the coloration might be of any suitable color. The preferred embodiment of the carbon black can be made to various shades of gray and/or black, but the invention contemplates that the coloration might be essentially any variation of color within the color spectrum, with the coloration not migrating into either the backing paper or the pressure sensitive adhesive, and still maintaining the desired release peel characteristics of the release liner from the pressure sensitive adhesive coated facing layer.

The application of the colorant must also occur under controlled conditions. When carbon black is dispersed in a hexane solvent, a pigment decantation occurs which decreases the concentration of silicone which can be applied to the surface of the backing paper. By switching to a more polar blend of heptane-toluene, in an approximate ratio of 2:1 as shown in Example 2, the pigment stays in suspension unlike the migration and contamination problems in the past. The maximum concentration of carbon black paste in the silicone solution was 1.3 weight percent wet, (dry carbon black alone on dry silicone was 20 weight percent).

The use of the more polar blend organic solvent also produced a homogeneous coating of the silicone on the backing paper. Without the polar solvents, a non-homogeneous coating was observed. The xylene concentration in the carbon black paste as used in this application, was at least one of the causes of this problem.

However, as clearly indicated in Example 3, the requirement of a solvent is clearly optional. Since it is possible to directly disperse into 100% solids, silicones, the application of carbon black can be applied in a solvent free system. This is a highly desirable feature with the tightening of air emission standards required by State and Federal Environmental Protection Agencies. It is obvious to one skilled in the art that parameters such as crosslinker concentration, catalyst concentration, oven temperature, coating thickness and silicone paste concentration all need to be balanced for effective application to the backing paper.

While in accordance with the patent statutes, a best mode and preferred embodiment have been described in detail, the invention is not limited thereto, rather the invention is measured by the scope of the attached claims.

What is claimed is:

1. A die cut label system comprising:

a backing sheet having an interior and an exterior surface;

a release coating deposited on at least a substantial portion of said interior surface, said release coating formed by the dispersion of a polysiloxane polymer and a non-migratory carbon black colorant in a mixed organic solvent volatilized by subsequent heat cure, said mixed organic solvent having one component which is at least partially polar and one component which is essentially non-polar, said colorant present in sufficient concentration to impart a first color or shade to said release coating;

a release adhesive in contact with said release coating;

a face stock in contact with said adhesive, said face stock having a second color or shade capable of contrasting with said first color or shade imparted to said release coating.

2. The die cut label system of claim 1 wherein said carbon black colorant is a paste.

3. The die cut label system of claim 1 wherein said carbon black colorant is a dispersion.

4. The die cut label system of claim 1 wherein said mixed organic solvent comprises heptane and toluene.

5. A die cut label system comprising:

a backing sheet having an interior and an exterior surface;

a release coating deposited on at least a substantial portion of said interior surface, said release coating formed by the dispersion of a polysiloxane polymer and a non-migratory carbon black colorant in a mixed organic solvent volatilized by subsequent heat cure, said mixed organic solvent having one component which is at least partially polar and one component which is essentially non-polar, said colorant present in sufficient concentration to impart a first color or shade to said release coating;

a releasable adhesive in contact with said release coating;

a transparent face stock in contact with said adhesive and containing printed indicia thereon, said printed indicia having a second color or shade capable of contrasting with said first color or shade imparted to said release coating.

6. The die cut label system of claim 5 wherein said carbon black colorant is a paste.

7. The die cut label system of claim 5 wherein said carbon black colorant is a dispersion.

8. The die cut label system of claim 5 wherein said mixed organic solvent comprises heptane and toluene.

* * * * *